United States Patent [19]

Bijon et al.

[11] 4,071,854
[45] Jan. 31, 1978

[54] DEVICE FOR THE STABILIZATION OF FLEXIBLE DISCS AND MORE PARTICULARLY OF VIDEODISCS AND READING APPARATUS ADAPTED TO THIS DEVICE

[75] Inventors: Paul Bijon; Bernard Fichot; Lucien Lainez, all of Paris, France

[73] Assignee: Thomson-Brandt, Paris, France

[21] Appl. No.: 689,821

[22] Filed: May 25, 1976

[30] Foreign Application Priority Data

May 30, 1975 France .................. 75 16999

[51] Int. Cl.² .................. H04N 5/76; G11B 21/20
[52] U.S. Cl. .................. 358/128; 179/100.3 V; 360/102; 360/103
[58] Field of Search .................. 358/127, 128; 179/100.3 V; 360/102, 103, 75

[56] References Cited

U.S. PATENT DOCUMENTS

| 3,123,677 | 3/1964 | Lauxen et al. .................. 360/103 |
| 3,166,997 | 1/1965 | Barcia et al. .................. 360/102 |
| 3,914,541 | 10/1975 | Elliot .................. 179/100.3 V |
| 3,947,888 | 3/1976 | Jarsen .................. 179/100.3 V |

FOREIGN PATENT DOCUMENTS

| 2,168,854 | 9/1973 | France .................. 360/102 |
| 2,198,204 | 3/1974 | France .................. 179/100.3 V |
| 2,051,840 | 5/1972 | Germany .................. 179/100.3 V |
| 1,172,310 | 6/1964 | Germany .................. 360/102 |
| 764,434 | 1/1955 | United Kingdom .................. 360/103 |
| 763,815 | 12/1956 | United Kingdom .................. 360/103 |

*Primary Examiner*—Raymond F. Cardillo, Jr.
*Attorney, Agent, or Firm*—Cushman, Darby & Cushman

[57] ABSTRACT

An apparatus for reproducing information on a flexible video disc in which the disc is accurately positioned facing the transducer head by structure including a fixed plate for prestabilizing the disc in rotation to a substantially constant distance in relation to the lower face of the plate. The plate has a central inlet coaxial with the axis of rotation for providing an air cushion between the disc and lower face of the plate and a rectangular elongated slot extending perpendicular to that axis. A fluid-tight casing houses a transducer head and includes a lower portion extending through the slot for providing a passage for the light beam and for fluid under pressure, the flow of fluid drawing the disc to a distance where equilibrium is established between the forces of attraction and repulsion.

8 Claims, 11 Drawing Figures

FIG_3

FIG_4

DEVICE FOR THE STABILIZATION OF FLEXIBLE DISCS AND MORE PARTICULARLY OF VIDEODISCS AND READING APPARATUS ADAPTED TO THIS DEVICE

The present invention relates to a device for stabilization of flexible discs, and particularly video discs, and a reading apparatus adapted to this device.

More particularly, the invention relates to a device intended to stabilize the distance between a reading organ (head) and a zone, located in the proximity of this organ, of a flexible information carrier, which are separated by a hydrodynamic fluid (air).

There are known devices for stabilization of this type with the aid of a hydrodynamic fluid, such as air cushion bearings associated with optical or magnetic reading organs working with the rigid or flexible information carriers.

One such stabilization device that can be used with rigid information carriers (discs) was described, for example, in French patent application No. 73.43601 filed Dec. 6, 1973 and published under No. 2,209,981 on July 5, 1974 titled "Air cushion bearing for optical systems" where a light optical reading head comprising a lens inside a chamber provided with a plane bottom and a central opening that constitutes a nozzle, is held at a constant distance from a rigid surface with the aid of a fluid under pressure applied to the chamber and escaping through the nozzle. The pressure of the fluid against the surface is balanced with a mechanical force drawing the head, which is mobile, toward the surface.

A similar device was described in U.S. Pat. No. 2,905,768 where the reading head comprises a plane face provided with two sets of openings of which one is connected to a chamber under pressure and the other to a chamber under low pressure to form an air cushion bearing between this face and the surface of the information carrier.

Another device, which can also be used with flexible discs, was described in British Pat. No. 982,855 published June 18, 1962 and U.S. Pat. No. 3,166,997. It comprises two nozzles placed on both sides of the disc forming two opposite air cushion bearings stabilizing the disc in position between them. The variation in thickness of the disc is compensated by the fact that the nozzle located on the recording side is carried is movable mounted with the aid of another hydraulic bearing. This device is relatively complex and costly.

In a device that can be used for reading of flexible discs described in French patent application No. 73.43944 filed Dec. 13, 1973 and published July 5, 1974 under No. 2,210,064 and U.S. Pat. No. 3,914,541, the disc is prestabilized by means of an air cushion between a plane stationary reference surface or turn table and the reading head comprises a chamber to which is applied a reduced pressure generating an air delivery which attracts the zone of the disc located in the proximity of the nozzle. This reduced pressure must be regulated because the distance varies as a function of it and varies as a function of the position of the head in relation to the center of the disc.

The stabilization device of the present invention makes it possible to avoid the complexity of known devices and assure a better stabilization by a self-regulating action by using a nozzle under pressure and the effect of equilibrium between the forces of repulsion and the force of the attraction of Bernouilli force acting on the zone of the disc opposite the nozzle.

According to the invention, a device for precise stabilization of the position of a portion of a flexible disc in relation to an head for reading information recorded on the disc, which can move approximately parallel to a radius of this disc, when the disc is in rotation in the proximity of a prestabilization surface plate and perpendicular to the axis of rotation of the disc, at least at the periphery of the disc. The reading transducer is contained in a fluid-tight casing, comprising a bottom whose outside face opposite the disc is approximately plane and provided with at least an opening located approximately in the middle of this face, the casing constituting the body of a nozzle whose inside is brought, with an air pump, to a pressure greater than the ambient pressure to generate a flow of air through the opening between the inside and outside of this bottom, the outside face of the bottom of the nozzle, which constitutes a surface of aerodynamic stabilization of the portion of the flexible disc in the vicinity of the opening, is placed at such a distance from the surface of the information carrying disc that the resulting force acting on said portion of the disc is located in a region where the so-called Bernouilli attractive force, due to a relative pressure difference between the center of said outside face and its periphery, which is approximately at ambient pressure, and generated by the decrease of the rate of air flow between the center and periphery of said stabilization surface, is predominant so as to attract the portion of the disk opposite this center at a stable distance where the forces of attraction and repulsion cancel each other.

More particularly, the plate is located above the disc and has a central inlet coaxial with the axis of rotation to provide an air cushion between the axis of rotation and the lower face of the plate. The casing extends through a rectangular elongated slot extending in the plate perpendicular to the axis.

The invention will be better understood and other of its characteristics and advantages will be brought out in the following description and accompanying drawings, given by way of example, in which:

Figures 1, 2:
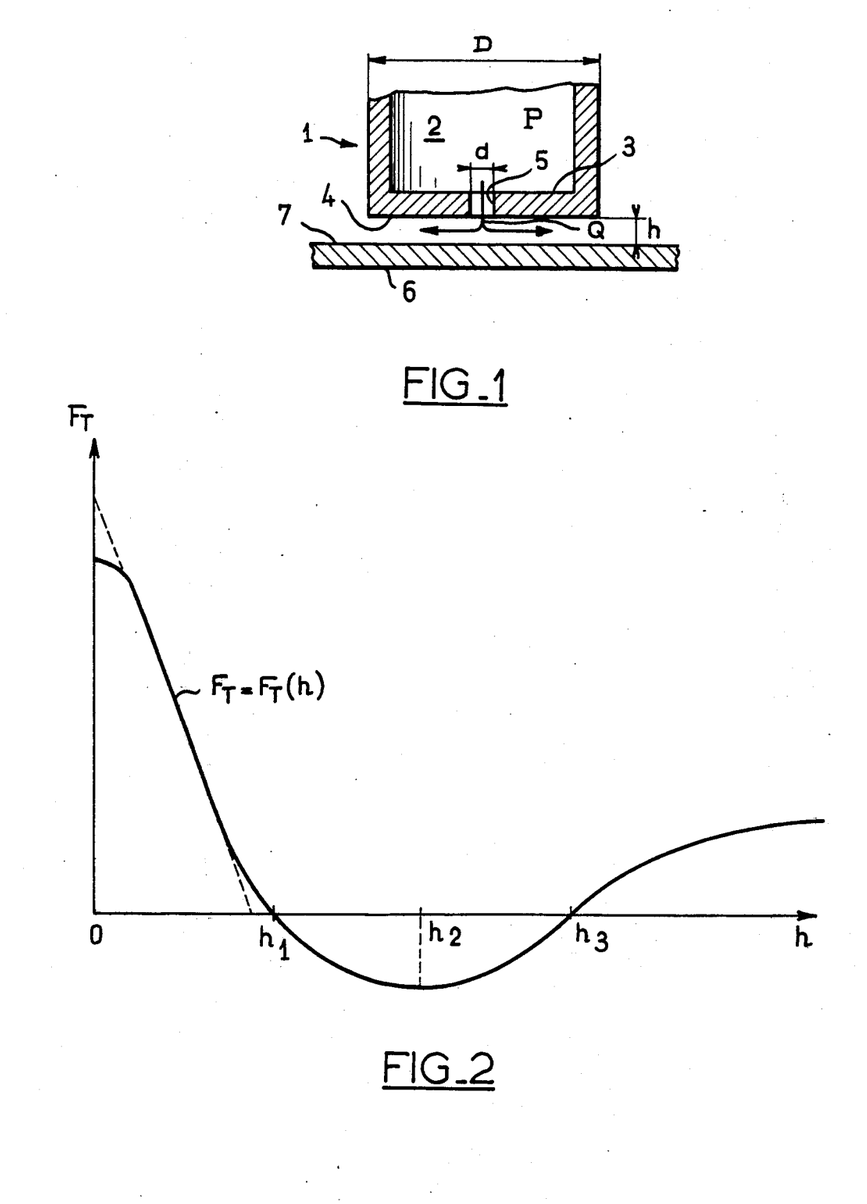
FIG. 1 is an illustration of the principle of fluid mechanics which is used in the invention and which shows a nozzle ejecting compressed air against a surface.
FIG. 2 represents a diagram of relative force F between the nozzle and surface as a function of distance $h$ between them for a determined air delivery or pressure.

In FIG. 1, illustrating the principle used, there are represented in section a nozzle 1 formed by a cylindrical case and comprising a fluid-tight chamber 2, subjected to an air pressure P greater than ambient pressure, and a bottom 3 having a plane outside face 4 of diameter D provided with a circular central opening 5 of diameter d, through which occurs, under the effect of the excess pressure P prevailing in the chamber, an air flow with an output Q. A part 6 in the shape of a plate comprising at least a substantially plane face 7 is placed opposite bottom 3 of nozzle 1, with face 7 of part 6 located approximately parallel to face 4 of bottom 3 at a distance h.

Under the effect of pressure P, the fluid contained in chamber 2 escapes through opening 5 and after having struck the zone located opposite the opening, flows in the interstice of height h between outside face 4 of bottom 3 and face 7 of part 6 with a constant output Q, a function of the difference of pressures between P and the ambient pressure.

Since section of the flow increases with the distance from hole 4, its velocity $v$ decreases and, consequently, its static pressure $P_s$ increases according to Bernouilli's law which in this case can be written: $P_s + \frac{1}{2}pv^2 =$ constant, where $p$ is the specific mass of the fluid.

This, therefore, implies that static pressure $P_s$ of the fluid increases from the center toward the periphery of bottom 3 where it hardly differs from ambient (atmospheric) pressure and where the velocity is approximately zero, and that in the central region, in the vicinity of opening 5 where the flow velocity $v$ is the greatest, static pressure $P_s$ is less than ambient pressure. This pressure drop in the vicinity of opening 5 in relation to the periphery of face 4 exerts an attractive force between nozzle 1 and the zone of part 6 located opposite the central region of the latter, a force which will be called hereafter Bernouilli force $F_B$ and which can be written:

$$F_B = \frac{p \cdot Q^2}{4\pi h^2} \ln \frac{D}{d}.$$

Further, there are exerted on the zone of part 6 opposite nozzle 1 two repelling forces which are respectively made up of the viscous force $F_V$ and impact force $F_M$, which can be written, if the fluid can be considered as incompressible and the flow non-turbulent, respectively:

$$F_V = \frac{3}{4} \frac{uQ}{h^3} (D^2 - d^2),$$

where $u$ is the viscosity coefficient of the fluid, and $$F_M = \frac{8p \cdot Q^2}{\pi \cdot d^2}.$$

The resulting force $F_T$ acting between nozzle 1 and part 6 is made up of the difference between the sum of the repelling forces $F_R = F_V + F_M$ and the Bernouilli attractive force $F_B$, disregarding the weight of the element that can move, as also the very slight internal stresses, considering the slight thickness of the disc, it can then be said that, for given dimensions D and delivery Q (pressure P), the resulting force F can be either negative (attraction) or positive (repulsion) depending on the distance h (or separation) between the nozzle and part. This is represented in FIG. 2 which illustrates a diagram of the resulting force $F_T$ as a function of the distance h between face 4 of nozzle 1 and upper face 7 of part 6.

On curve $F_T = F_T(h)$ of FIG. 2, there can be distinguished three distinct areas of h for which the resulting force $F_T$ has a different sign.

In the first area, going from $h = 0$ to $h = h_1$, the resulting force $F_T$ is positive (repulsion) and it diminishes as a function of the distance to $h_1$ where $F_T(h_1)$ becomes zero. Since here viscous force $F_V$ predominates, this first area will be called the viscous or lubrication area or region and it is used in all the known air cushion bearings such as described, for example, in the British patent cited above. In the second area of values h, going from $h_1$ to $h_3$, the resulting force $F_T$ is an attractive (negative) force in which the Bernouilli force $F_B$ is predominant, this area $h_1$ to $h_3$ will be called the Bernouilli area or region and will be used for stabilization of flexible discs in rotation according to the invention.

Curve $F_T = F_T(h)$ passes through a minimum corresponding to a maximal attractive force for a distance $h = h_2$ and then rises to go through the abscissa at $h = h_3$. Beyond $h_3$, the resulting force $F_T$ becomes positive and asymptotically approaches a value determined by impact force $F_M$. The area where h is greater than $h_3$ will therefore be called the impact area or region and does not appear easily utilizable for stabilization of the relative positions of nozzle 1 and part 6.

Curve $F_T = F_T(h)$ does not take into account the fact that part 6 is made up of a flexible disc with slight thickness in rapid rotation prestabilized in position with the aid of an approximately plane surface placed on one side of the disc where forces other than those mentioned above come into play.

However, the resulting curve is analogous to that of FIG. 2 and there will be a Bernouilli attractive force which is exerted on the zone of the disc opposite bottom 3 of nozzle 1 for distances between $h_1$ and $h_3$.

To obtain a good stabilization, one uses the part of the Bernouilli region located between $h_1$ and $h_2$ where the attractive force attracts the zone of the flexible disc opposite nozzle 1 so as to bring it close to bottom 3 of the disc to a distance equal to $h_1$ where the forces of attraction and repulsion cancel each other.

Thus, there is obtained a stable control at a distance having $h_1$ as the average value. When an external disturbance reduces the distance to a value less than $h_1$, the viscous force of repulsion increases to bring the distance back to $h_1$ and reciprocally, when the distance increases beyond $h_1$, the Bernouilli force brings it back to this equilibrium value.

The action of nozzle 1 fed by an excess pressure P on a flexible disc in rotation is explained below with reference to FIG. 3 which schematically represents in elevation and partially in section a simple embodiment of a stabilization device according to the invention. Such an arrangement with a prestabilization surface and a stabilization nozzle placed on both sides of a disc 10 is suitable, for example, for optical reading by reflection.

Figure 3:
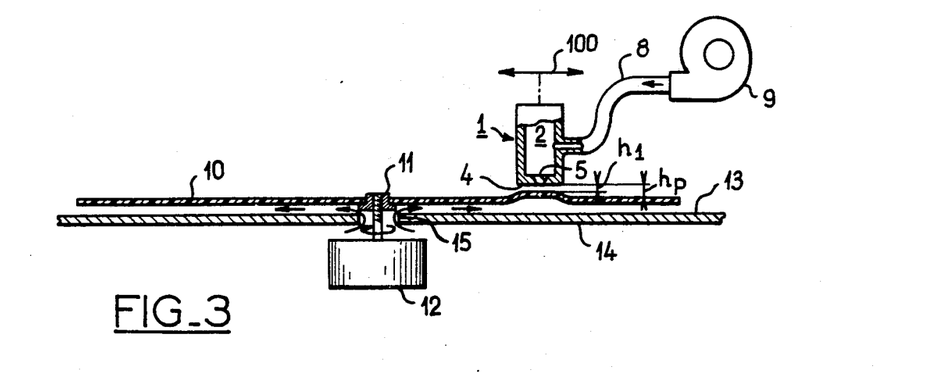
FIG. 3 illustrates schematically, partially in section, a simple embodiment of a stabilization device according to the invention.

In FIG. 3 can be seen the outside of nozzle 1 which provided in its interior with an optical system (not shown) similar to a microscope lens with slight field depth and an opening 5 through which passes the air flow and light beam coming from a coherent source, such as a laser, (not shown). Chamber 2 of nozzle 1 is connected by means of a delivery tube 8 to a pump 9, which puts it at a pressure P greater than ambient pressure. A flexible disc 10 located under the nozzle is placed on a boss 11 fixed to the shaft of a motor 12 which drives the disc at high rotating speeds (1500 or 1800 rpm). Under disc 11 is placed an approximately plane stabilization surface 13 made up, for example, of a plate 14 and which comprises in its middle, around the axis of rotation of disc 10, an opening 15 allowing air to be aspirated to form between the lower face of disc 11 and stabilization surface 13 an air cushion generated by disc 10 in rapid rotation. This air aspirated through opening 15 is driven by the lower face of disc 10 in rapid rotation toward the periphery of the disc under the effect of centrifugal force.

There is thus obtained a prestabilization of flexible disc 10 with the aid of stationary surface 13, which is known in itself and described, for example, in German patent application No. 2,051,840 or in French patent application No. 73.31190 filed Aug. 29, 1973 and published under No. 2,198,204 on Mar. 29, 1974. Flexible disc 10 will, therefore, rotate approximately at a predetermined distance from the prestabilization surface 13 with variations due to possible imperfections of disc 10 or of the driving mechanism, which are greater than the depth of the field of the reading optical system (not shown).

It will be noted here that to follow the tracks carrying the recording, nozzle 1 can move along arrow 100, parallel to a radius of disc 10. The optical system, which is integrated with nozzle 1, has such a field depth that the amplitude of the signal delivered by the reading head diminishes by half if the disc moves from the lens by ± microns. Consequently, the distance between the lens and zone of disc 10 opposite the system should be stabilized in position at least with a precision corresponding to this tolerance.

This is obtained by placing lower face 4 of nozzle 1 at a distance $h_p$ from prestabilized disc 10, located in the Bernouilli region, i.e., greater than $h_1$ and less than $h_3$ and preferably located in the vicinity of $h_2$ of FIG. 2, so that this nozzle 1 in excess pressure P exerts a Bernouilli attractive force on this zone and brings it, by a deformation of the disc, to a distance $h_1$ from face 4, where the forces of attraction and repulsion acting on this zone cancel each other, taking into account the additional forces generated by the rotation of disc 10 and the fact that the forces due to the stresses of the material are practically negligible because of the slight thickness of the flexible disc (about 150 microns).

Thus, there is obtained a control of the distance of the read zone of disc 10 in relation to face 4 of nozzle 1, which constitutes a stabilization surface. This distance varies slightly as a function of the position of the nozzle in relation to the axis of rotation of the disc and as a function of output Q which must be stabilized or controlled to the position of the nozzle.

Figure 4:
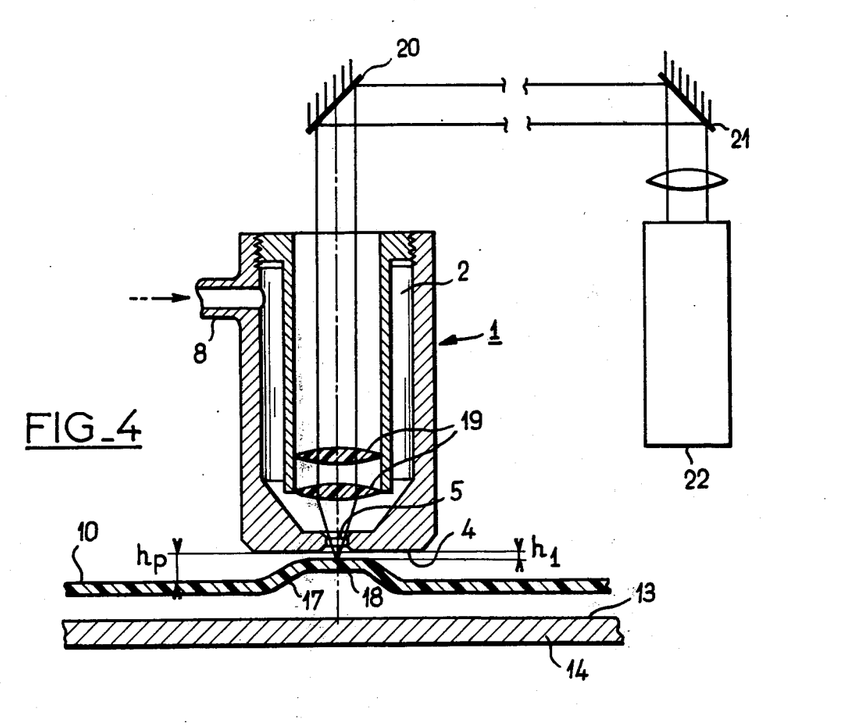
FIG. 4 shows an axial section in elevation of a detail of FIG. 3, particularly nozzle 1.

The effect of nozzle 1 under pressure on flexible disc 11 in rotation can also be seen in FIG. 4 which represents in section an embodiment of a reading head applicable in the case of an arrangement of the reading device similar to the figure.

There is reproduced in FIG. 4 an axial section in elevation of an optical reading head for video disc 11 comprising a lens 19 illuminated through mirrors 20 and 21 by a coherent light source 22, such as a laser. Lens 19 is surrounded by the body of nozzle 1 forming a fluid-tight chamber 2 which is put under pressure P through delivery tube 8. The bottom of nozzle 1 is provided with a central opening 5 surrounding also the axis of the optical system (lens) through which passes the light ray focused on a point at a distance $h_1$ from the plane outside face 4 of nozzle 1.

If the distance $h$ between flexible disc 10 in rotation and the outside face 4 of the bottom of nozzle 1 is selected to be greater than $h_1$ and preferably close to $h_2$ (maximal attractive force), disc 10 is deformed in the way indicated in FIG. 4, i.e., the zone in proximity with opening 5 is drawn toward the opening to distance $h_1$ where the resulting force is zero. The deformation of the disc in the form of a dome which comprises conical sides 17 and a summit 18 flattened or slightly convex in the form of a crater.

This deformation of flexible disc 10 makes it possible to compensate for the spurious deformations with which it can be affected, because its amplitude is considerable, on the order of 100 microns over a diameter of 5 to 8 millimeters.

Experience has shown that it is advantageous to use a nozzle 1 having a plane face 4 with a diameter D of 15 to 35 millimeters and an opening 5 of a diameter $d$ between 0.7 and 1.8 millimeters approximately. It has also been found the output Q varies a little as a function of pressure P and that, for example, from a pressure P of 500 grams to about 2000 grams output Q would vary only between about 4 and 5 liters/minute for a given opening diameter $d$.

In a variant, the bottom of nozzle 1 and opening 5 are given an oblong shape (elliptical or oval, for example) in radial direction in relation to the disc. This has the effect of giving the dome an elongated shape and consequently of giving its summit a more flattened shape in the radial direction. This makes it possible to give the light beam a deflection in the radial direction without changing the lens-disc distance. Thus, there is achieved a cover of the lens whose lower plane part had 30 millimeters of length and 20 millimeters of width, while opening 5 had 2 millimeters by 1.2 millimeters.

Figure 5:
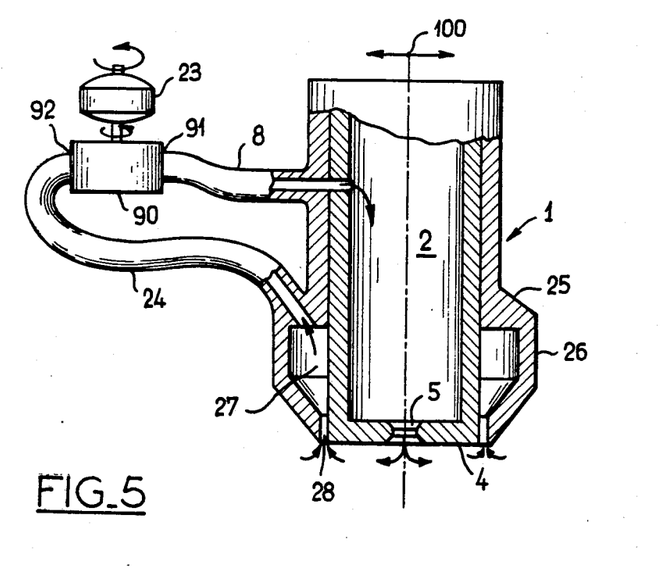
FIG. 5 shows an axial section in elevation of an improved embodiment of nozzle 1.

A further embodiment of nozzle 1 is shown in axial section by FIG. 5. In FIG. 5, the body of nozzle 1 forming excess pressure chamber 2 is surrounded by an outside jacket 25 which comprises a hollow enlargement 26 forming an annular chamber 27 terminating on the periphery of plane bottom face 4 of nozzle 1 at an annular opening 28. Annular chamber 27 is put under reduced pressure, for example by connecting it via a second delivery tube 24 to suction inlet 92 of pump 90 (driven by a motor 23) whose output 91 is connected by opening 5 to chamber 2. The effect of suction on the periphery of nozzle 1 increases the zone affected by the attractive force, because it is added to the Bernouilli force, but it reduces the difference in static pressures between the center and periphery of outside face 4. This results in a reduction of the height of the dome, i.e., of the difference $(h_p - h_1)$, by increasing the stability of the regulation.

Figure 6:
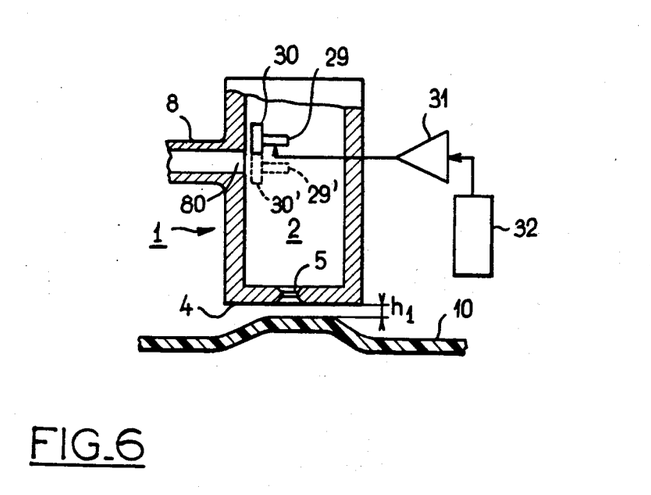
FIG. 6 represents in section and schematically a means for regulating the delivery of nozzle 1 and, consequently, the distance between the nozzle and disc.

FIG. 6 indicates schematically and in section a means for regulating the air delivery in nozzle 1.

It consists in more or less blocking the opening of connection 80 of delivery tube 8 to chamber 2 by a part in the shape of a plate 30 which is fixed on the end of a movable device 29, such as a bimetallic strip, whose position is controlled between two extremes, one (open) represented by solid lines and the other (closed) by broken lines (29' and 30'). The movement is controlled by an amplifier 31 whose input is fed by a standard device 32 for measuring the distance between outside face 4 of the bottom of nozzle 1 and the surface of disc 10.

Variation of the position of part 30 blocking connecting opening 80 has the effect of causing a variation in the delivery of air to chamber 2 and, consequently, the pressure inside it and the air delivery Q passing through opening 5 of the bottom of nozzle 1, on which depends distance $h_1$ between the portion of disc 10 opposite this opening.

The above-described apparatus for optical reading of a flexible video disc 10 by reflection has the prestabilization surface 13 of the disc in rotation by an air cushion is plane, continuous (with the exception of central air intake 15) and placed on one side (bottom) of the disc, while the head for optical reading by reflection with the incorporated stabilization device, is placed on the other side (top) of the disc. Such an arrangement requires the use of a disc metallized on its face opposite the face carrying the recording and intended to be placed facing the reading head. On starting up, the metallized face rests on surface 13 and its friction can damage it; it is therefore advantageous to arrange prestabilization surface 13 to be above disk 10 in the way described, for example, in French patent application No. 2,198,204 cited above. Adherence of the thin metal coating, however, presents problems in a flexible disc which can be bent during handling.

Figure 7:
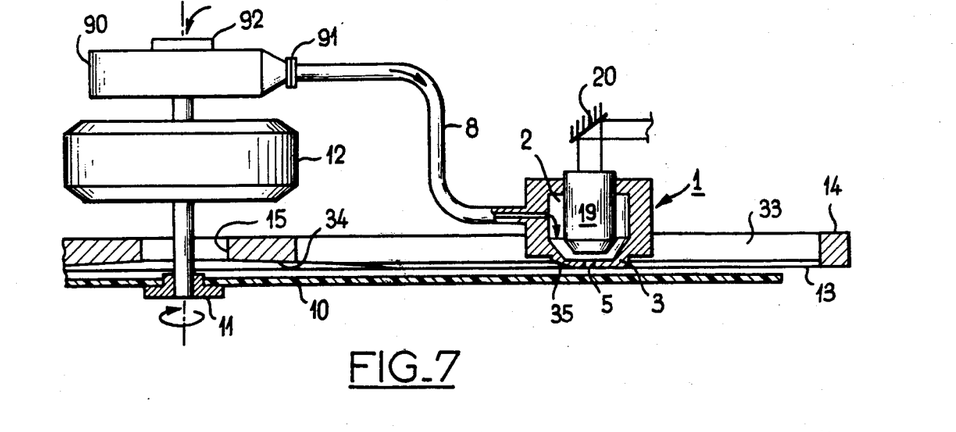
FIG. 7 illustrates schematically, partially in section, an improved embodiment of a stabilization device according to the invention.

A stabilization device according to the invention with a prestabilization surface 13 placed above the disc is illustrated schematically and in section by FIG. 7. In this device the reading head comprising nozzle 1 is placed on the same side of disc 10 as prestabilization surface 13 which comprises a radial slit permitting the movement of nozzle 1 along a radius of the disc. Such an arrangement can advantageously be used for reading of a flexible disc by transparency, where the disk is illuminated on one side by a light beam focused at the level of the track and on the other side is placed a photoelectric transducer (not shown) transforming the light transmitted through the disc, which is then transparent, into an electric signal.

FIG. 7 represents schematically in partial section and in elevation, the embodiment of an apparatus for reading a flexible video disc with a stabilization device according to the invention, adapted to reading by transparency or by reflection.

Figure 8:
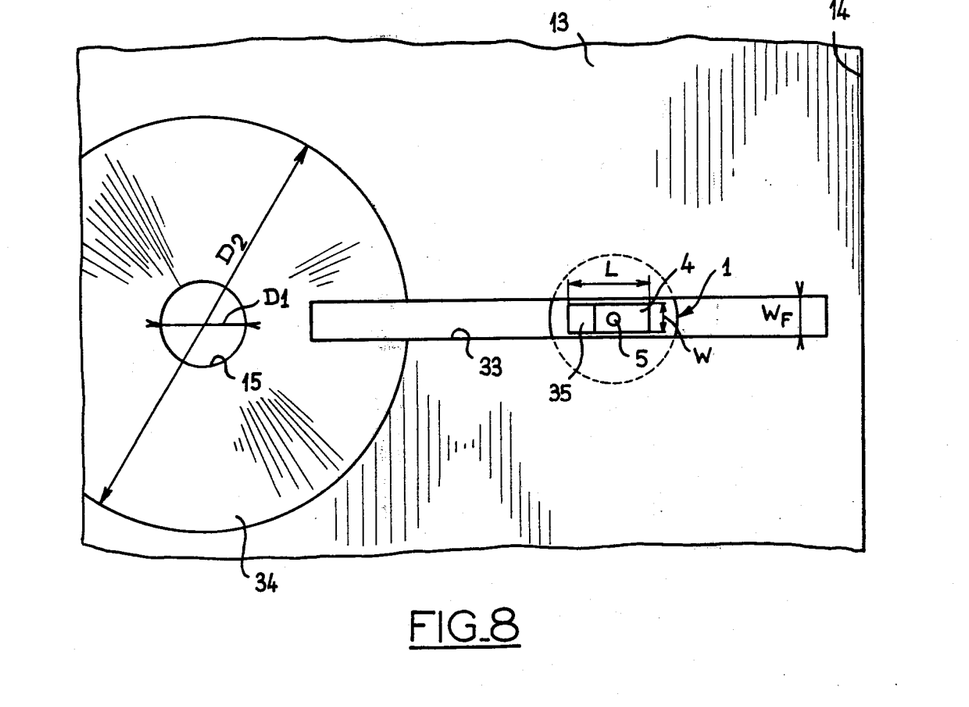
FIG. 8 is a partial bottom view of the prestabilization surface 13 of FIG. 7.

FIG. 8 is a partial bottom view of the prestabilization plate 14 of FIG. 7 with nozzle 1 engaged in the radial slit of the latter.

In FIG. 7, motor 12 driving a sleeve or boss 11 which carries the disc also drives pump 90 which applies, through flexible delivery tube 8, the excess pressure P to chamber 2 of nozzle 1 whose bottom 3 comprises the stabilization surface of the read zone of the disc and opening 5 through which the air flows with output Q. Prestabilization surface 13 comprises a radial slot 33 slightly longer than the width of the area of disc 10 carrying the recording tracts to permit scanning of the tracks by the reading head of which nozzle 1 is a part. Bottom 3 of nozzle 1 going through slit 33 in the proximity of the face of disc 1 carrying the recording presents a rectangular shape of length L which can advantageously be between 15 and 25 millimeters approximately. Width W of bottom 3 of nozzle 1 is selected to be as narrow as possible, i.e., between about 6 and 8 millimeters, so that the disturbance introduced in the prestabilization by slit 33, whose width $W_F$ should be about 1 to 2 millimeters greater than that of W of bottom 3, is as small as possible while assuring the inside face 4 of the bottom a sufficient stabilization surface. The difference in widths W of bottom 3 and width $W_F$ of slit 33 permits the escape of a substantial part of the air blown through opening 5 toward the top of the prestabilization plate. With such an arrangement, disc 10 is prestabilized in flight, for example, at a distance of about 250 to 350 microns from surface 13 and face 4 can be placed about 100 to 150 microns below surface 13, which, with a delivery of the order of 4 to 6 liters/minutes, applies suction to the affected zone of disc 10 so as to make it come close to it, for example, to some fifty microns. It is possible to use openings 5 with a diameter between 0.8 to 1.2 millimeters approximately and pressures between about 300 and 1500 grams.

Studies have shown that when a disc 10 in rapid rotation flies above or below a plane prestabilization surface 13 provided with a central air opening 15, the air cushion thus obtained presents a greater thickness around the axis of rotation than at the periphery of flexible disc 10 which then undergoes a slight bell-like deformation. This deformation generates spurious stresses in the material and it is necessary either to vary the Bernouilli attractive force according to the distance of nozzle 1 in relation to the center, or move nozzle 1 along a curve parallel to the radius of deformed disc 10 which varies with the rigidity of the material and the thickness of disc 10.

To compensate for this deformation and to obtain a plane disc 10 and reduce the internal stresses to a minimum, it has been proposed to provide a stabilization surface whose divergence in relation to a plane parallel to the plane of flight of the disc would be reduced as a function of the distance in relation to the axis and would approach the periphery of this plane asymptotically. Such a surface is difficult to make and experience has shown that it suffices to provide in prestabilization plate 14, which is formed as a plane peripheral surface 13, a central recess presenting opposite disc 10 a conical surface 34. For a diameter of surface 13 of about 310 millimeters (disc 30 cm) and a central aspiration opening 15 with a diameter $D_1$ between 50 and 60 millimeters, a conical surface 34 of outside diameter $D_2$ (or base) between a fourth and half of the diameter of the disc, preferably about one third, i.e., between about 90 and 120 millimeters, with an inclination of the generatrix on the order of 1° to 3° in relation to plane 13, gives very satisfactory results in regard to the surface flatness of disc 10, which makes it possible to avoid loss of focussing during reading with a straight movement of nozzle 1.

The combined effects of slit 33, nozzle 1 and the rapid rotation on flexible disc 10 cause the weight of the disc to have a tendency to make it pivot downward very slightly around a horizontal axis located in the vicinity of opening 5 of nozzle 1 so that the surface of disc 10 approaches with the inside end close to the axis of rotation of face 4. A slight bevel 35 with a slight pitch, of about 3° to 5° for example, over a fourth to one third of the length L of face 4, makes it possible to avoid this drawback and to bring this inside end to the level of prestabilization surface 13 to protect disc 10.

Figure 9:
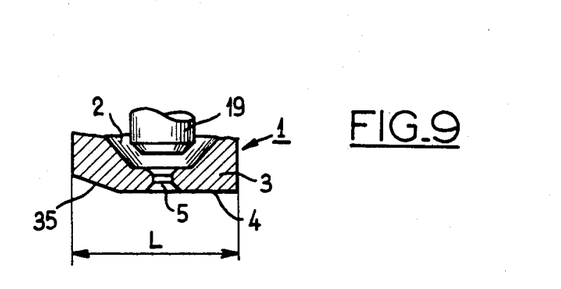
FIG. 9 illustrates in section an embodiment of bottom 3 of nozzle 1 applicable to the device of FIG. 7.

FIG. 9 illustrates more in detail an axial section of bottom 3 showing the inclined plane or bevel 35, made on the side turned toward the axis of rotation of disc 10.

Figure 10:
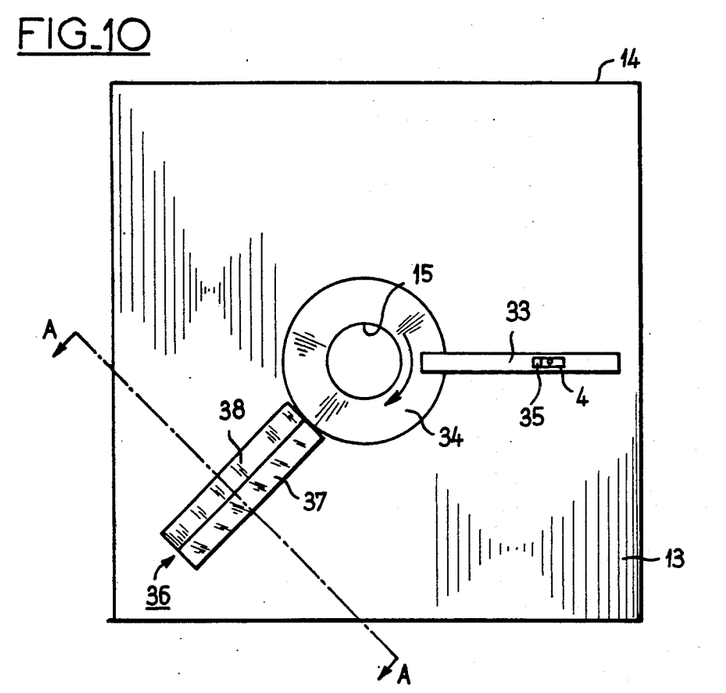
FIG. 10 is a schematic bottom view of an improvement of the prestabilization plate 13 of FIG. 8.
Figure 11:
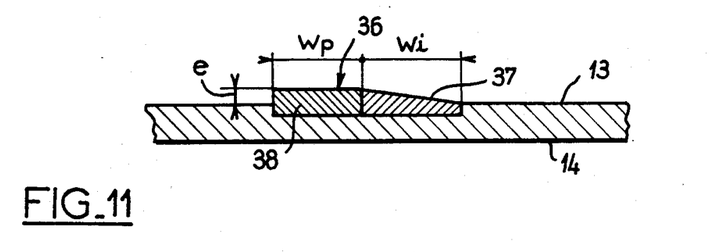
FIG. 11 shows a section along AA of FIG. 10 illustrating the radial projection or compensating flange 36.

FIG. 10 is a bottom view of the prestabilization surface 13 provided with an improvement making it possible to compensate for the effect of slit 35 and FIG. 11 is a section along AA of FIG. 10.

In an improved embodiment, shown in FIGS. 10 and 11, prestabilization surface 13 is provided with a radial projection or flange 36 comprising an inclined plane 37 gradually (linearly) descending from surface 13 with a slight angle to a plane parallel with surface 13 at a height of about 300 to 500 microns. Radial flange 36 is preferably placed at about 120° in relation to slit 33 in the direction of rotation of the disc and extends from the periphery of disc 10 (at about 300 millimeters from the axis of rotation) to the beginning of conical surface 34. Flange or projection 36 begins with an inclined plane 37 with a width $W_i$ of about 15 to 20 millimeters and then continues with a parallel plane 38 with a width $W_p$ of about 10 to 15 millimeters, for example. The dimensions of the flange 36 are determined experimentally as a function of those of slit 33, of opening 15, of conical surface 34 and of the height of flight of disc 10. Such an arrangement has the result of a distinct improvement of the prestabilization by surface 13.

It will be noted here that with a pressure of 1 to 1.5 kilograms and a nozzle having an opening of 0.9 millimeters it was possible to obtain variations $\Delta h$ of the distance between disc 10 and nozzle 1 of about 4 microns on the entire reading area.

The stabilization device described above and the variants accessible to a man of the art are applicable in apparatus for reading flexible discs carrying an optical or magnetic recording, where it is a question of maintaining constant, within very narrow limits, the distance between the disc and reading head, without contact between the two elements.

It will also be noted that, in a stabilization device as described above, it is possible to use pressures P between 300 grams and 2 kilograms with opening diameters $d$ between 0.7 and 1.8 millimeters.

We claim:

1. An apparatus for reproducing information recorded on an annular band of a flexible video disc, comprising:
   means for driving said disc at a high velocity about an axis of rotation;
   means for mounting said disc on said driving means;
   a transducer head for electro-optically reproducing said recorded information having means for optically focussing a beam of coherent light and mounted for displacement along a line perpendicular to said axis of rotation from one end to another of said annular disc band; and
   means for accurately positioning a portion of said disc facing said transducer head in relation to said focussing means, said positioning means including:
   a fixed plate having a substantially flat lower face extending perpendicular to and substantially symmetrical to said axis of rotation and located at a predetermined distance above said disc mounting means for aerodynamically prestabilizing said disc in rotation to a substantially constant distance in relation to said lower face, said plate having a central inlet opening coaxial with said axis for providing an air cushion between said lower face and the upper face of the disc in rotation and a rectangular, elongated slot perpendicular to the axis of rotation for displacing said transducer head above and substantially in parallel to a radius of said disc in rotation;
   pump means for providing a source of fluid under pressure above ambient pressure;
   a fluid-tight casing for housing said transducer head connected by flexible pipe means to said pump means and including a lower portion penetrating through said slot and having a width smaller than that of said slot for providing gaps on each side thereof and a bottom face including a substantially flat, rectangular portion facing the upper face of the disc and a substantially centrally located outlet aperture for providing a passage for both said lightbeam and said fluid under pressure, said bottom face of said casing being situated below the lower face of said plate at such a distance from the upper face of said disc in rotation that the force exerted by the flow of said fluid through said aperture and between said bottom face and the portion of said disc facing it is in a range where the Bernouilli force of attraction, produced by a relative pressure difference due to the deceleration of the fluid flow between the center and the periphery thereof, is predominant, whereby said facing disc portion is drawn towards said bottom face to a distance where the equilibrium is established between the forces of attraction and repulsion acting thereupon.

2. Apparatus as claimed in claim 1, wherein the bottom face of said casing comprises, on its side turned towards the axis of rotation, a bevelled portion for providing an inclined surface rising gradually from its flat portion towards the lower face of said plate as its distance relative to said axis decreases.

3. Apparatus as claimed in claim 2, wherein the length of said bevelled portion lies between a quarter and a third of the total length of said bottom face.

4. Apparatus as claimed in claim 1, wherein the lower face of said plate comprises a conical recess coaxial with said central inlet opening providing a surface gradually descending from above with its increasing diameter, whereby to improve the flatness of the disc in rotation.

5. Apparatus as claimed in claim 4, wherein the base of the conical recess has a diameter lying substantially between a quarter and a third of the diameter of the flexible disc.

6. Apparatus as claimed in claim 4, wherein the inclination of the generatrix of the surface of said conical recess lies between one to three degrees relative to the flat peripheral portion of the lower face of said plate.

7. Apparatus as claimed in claim 1, wherein the lower face of said plate further comprises a radial elongated projection extending substantially from the base of the conical recess to the periphery of the disc in rotation, whereby to compensate for the perturbation caused by said slot.

8. Apparatus as claimed in claim 1, wherein said projection comprises an inclined plane gradually descending below toward the disc in the direction of its rotation followed by a plane parallel to said lower plate face.

* * * * *